United States Patent
Laizerovich et al.

(10) Patent No.: US 10,942,764 B1
(45) Date of Patent: Mar. 9, 2021

(54) TRANSACTION ANALYSIS TOOL AND ASSOCIATED METHOD FOR AN INTEGRATED COMPUTING SYSTEM

(71) Applicant: VCE IP Holding Company LLC, Richardson, TX (US)

(72) Inventors: Orone Laizerovich, Plano, TX (US); Stacy Rhodes, Murphy, TX (US); Jean Xia, Frisco, TX (US); Russell Anderson, Rowlett, TX (US); Puja Sarda, Plano, TX (US); Rumalla Harshita, Dallas, TX (US)

(73) Assignee: EMC IP Holding Company LLC, Round Rock, TX (US)

( * ) Notice: Subject to any disclaimer, the term of this patent is extended or adjusted under 35 U.S.C. 154(b) by 416 days.

(21) Appl. No.: 15/353,597

(22) Filed: Nov. 16, 2016

(51) Int. Cl.
*G06F 9/46* (2006.01)
*G06F 9/50* (2006.01)

(52) U.S. Cl.
CPC ............ *G06F 9/466* (2013.01); *G06F 9/5038* (2013.01)

(58) Field of Classification Search
CPC ............................... G06F 9/466; G06F 9/5038
See application file for complete search history.

(56) References Cited

U.S. PATENT DOCUMENTS

| | | | | | |
|---|---|---|---|---|---|
| 6,775,644 | B2* | 8/2004 | Myers | ................. | G06F 11/3414 |
| | | | | | 702/186 |
| 7,089,558 | B2* | 8/2006 | Baskey | ................. | G06F 9/5077 |
| | | | | | 709/215 |
| 7,757,214 | B1* | 7/2010 | Palczak | ................. | G06F 9/5083 |
| | | | | | 709/223 |
| 2003/0069957 | A1* | 4/2003 | Malmskog | .......... | H04L 41/5083 |
| | | | | | 709/223 |
| 2003/0110243 | A1* | 6/2003 | Soulhi | ..................... | H04L 43/50 |
| | | | | | 709/223 |
| 2007/0288625 | A1* | 12/2007 | Chakra | ............... | G06F 11/3433 |
| | | | | | 709/224 |
| 2008/0016374 | A1* | 1/2008 | Gee | ........................ | G06F 1/3203 |
| | | | | | 713/300 |
| 2014/0229607 | A1* | 8/2014 | Jung | ................... | H04L 43/0876 |
| | | | | | 709/224 |

OTHER PUBLICATIONS

Jensen et al. A Time-Driven Scheduling Model for Real-Time Operating Systems. [online]. IEEE., pp. 112-122. Retrieved From the Internet <https://pdfs.semanticscholar.org/4c05/0ee67e590a1f102a4b605ff7d13f4d746cc1.pdf> (Year: 1985).*

(Continued)

*Primary Examiner* — Emerson C Puente
*Assistant Examiner* — Jonathan R Labud
(74) *Attorney, Agent, or Firm* — Polsinelli PC

(57) ABSTRACT

A transaction analysis system includes a computer-executable tool for obtaining first and second measured elapsed times to complete a transaction on at least one of the resources of an integrated computing system at first and second loading levels, respectively. The tool then generates, using a curve fitting algorithm, a function according to the first and second measured elapsed times to complete the transaction at the first and second loading level. The resulting function indicates an expected level of performance of the transaction at varying degrees of loading levels.

21 Claims, 6 Drawing Sheets

(56) References Cited

OTHER PUBLICATIONS

Tan et al. Secure Hardware Performance Analysis in Virtualized Cloud Environment. [online]. Hindawi Publishing., pp. 1-9. Retrieved From the Internet <http://downloads.hindawi.com/journals/mpe/2013/685764.pdf> (Year: 2013).*

Malik et al. Pinpointing the Subsystems Responsible for the Performance Deviations in a Load Test. [online] IEEE., pp. 201-210. Retrieved From the Internet <https://ieeexplore.ieee.org/stamp/stamp.jsp?arnumber=5635038> (Year: 2010).*

* cited by examiner

TRANSACTION ANALYSIS TOOL AND ASSOCIATED METHOD FOR AN INTEGRATED COMPUTING SYSTEM

TECHNICAL FIELD

Aspects of the present disclosure relate to computing devices and, in particular, to a transaction analysis tool and associated method for an integrated computing system.

BACKGROUND

Computing resources, which may include storage arrays and network resources used by enterprises, such as corporations and universities, are often provided by multiple computing devices (e.g., hardware resources) that function in a collaborative manner to meet the computing resource needs of the enterprise. Business organizations often purchase sufficient quantities of computing resources to keep up with the varying demands of their business need. The purchase of too many additional resources, however, often yields excess capacity representing wasted investment and lost opportunity cost from over-investment. Conversely, the purchase of too few additional resources may yield insufficient capacity that can be damaging for business operations in numerous ways including handling Web traffic to a company Website, managing internal application demand, inhibiting pursuit of opportunities, responding to competition, and other concerns. Consequently, information technology (IT) organizations within these organizations may invest in tools to help plan for an appropriate capacity.

SUMMARY

According to one aspect of the present disclosure, a transaction analysis system includes a computer-executable tool for obtaining first and second measured elapsed times to complete a transaction on at least one of the resources of an integrated computing system at first and second loading levels, respectively. The tool then generates, using a curve fitting algorithm, a function according to the first and second measured elapsed times to complete the transaction at the first and second loading level. The resulting function indicates an expected level of performance of the transaction at varying degrees of loading levels.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Embodiments of the present disclosure provide a transaction analysis tool for an integrated computing system that generates a function for estimating an elapsed time for conducting transactions in the integrated computing system based upon varying loading levels. Conventional approaches for estimating such times have often involved manual iterations of the integrated computing system's design until an adequate performance level of transaction processing is achieved, which is often an arduous, time consuming endeavor. Embodiments of the present disclosure provide a solution to this problem by providing a transaction analysis tool that measures elapsed transaction times at various loading conditions and generates a function (e.g., a line, a curve, etc.) for estimating an expected performance level of the integrated computing system at various loading levels that may be experienced by the system. Using this information, designers and administrators may efficiently analyze and adjust the configuration of the integrated computing system while maintaining adequate performance objectives.

Today's integrated computing systems are typically heavily customized according to widely varying requirement of customers. Due to such variety in customizations, the configuration may vary to such a degree that it affects how each component may perform. For example, one user may request additional storage capacity that requires the implementation of an additional expansion shelf or other form of computer memory. However, ancillary components that are added to the integrated computing system to enable the use of the expansion shelf may cause a degradation of performance in the storage system. Thus, there has heretofore remained an unsatisfied need for determining an expected performance of integrated computing system's at varying loading conditions so that, among other things, these integrated computing systems can be customized while maintaining an adequate level of performance.

Conventional approaches have involved manual iteration of an integrated computing system's design to meet customer requirements while maintaining an expected level of performance. When the performance of certain components is degraded, designers may then be forced to further customize the physical layout of the integrated computing system to mitigate the degradation of performance. But these work-arounds are typically trial-and-error endeavors that are time consuming and are not very efficient in their operation.

Figure 1:
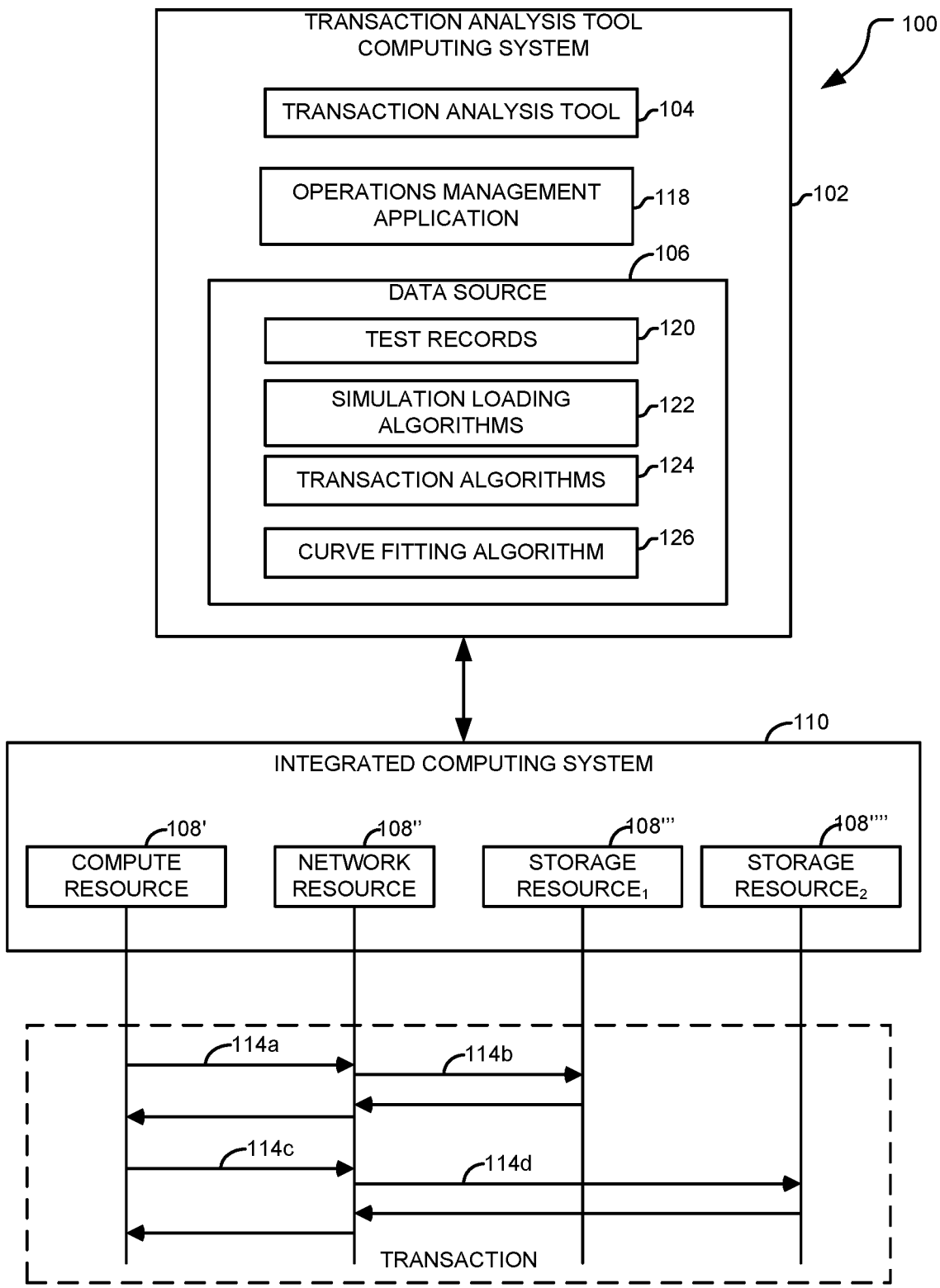
FIG. 1 illustrates an example transaction analysis system according to one embodiment of the present disclosure.

FIG. 1 illustrates an example transaction analysis system 100 according to one embodiment of the present disclosure. The system 100 includes a transaction analysis tool computing system 102 having a transaction analysis tool 104 and a data source 106. As will be described in detail herein below, the transaction analysis tool 104 communicates with the resources 108 of an integrated computing system 110 to measure multiple elapsed times required to conduct a transaction 112 at varying loading levels incurred by those resources 108, and generates a function for estimating an expected transaction time at other loading levels that may be incurred by those resources 108.

In general, the transaction analysis tool 104 obtains empirical measurements of transactions on a loaded and operational integrated computing system. Transactions often require a certain finite amount of time to complete and the elapsed time to complete and may vary based upon the configuration of certain components in the integrated computing system. By obtaining precise measurements of the transaction at different configurations, designers will be able to customize the integrated computing system according to the customer's requirements while ensuring that the components function at a desired level of performance.

For example, the integrated computing system 110 may be configured according to a first configuration. Next, a certain transaction with a specified loading condition (e.g., 20 percent (%) loading level) is then executed on certain resources 108, and its elapsed time to completion measured. The integrated computing system is then executed to perform the same transaction with a different loading condition (e.g., 40% loading level). Other additional transactions may be executed and their elapsed times to completion recorded. After several timing tests have been conducted at various loading levels, the obtained data may be plotted using a curve fitting algorithm to obtain a function in which the function indicates how the integrated computing system 110 performs under various loading conditions. Users may repeat the above test at differing configurations of the integrated computing system to pick a certain configuration that experiences the best performance based on the derived function; that is, the lowest degradation in performance under the varying loading conditions.

A transaction generally refers to processing conducted on an integrated computing system to perform a certain specified operation. As shown, the example transaction 112 may include multiple transaction elements 114 that when performed in a particular sequence, form the transaction that is conducted on the resources 108. For example, a compute resource 108' may issue a request to a network resource 108" for reading a segment of data from either one of two or more storage resources 108''' or 108'''' based upon information included in the request. In a first case, a transaction element 114*a* requests a read operation to be conducted to a first storage resource 108'''; thus, the network resource 108" may generate a transaction element 114*b* that is issued to the first storage resource 108'''. In a second case, another transaction element 114*c* requests a read operation to be conducted to a second storage resource 108''''; thus, the network resource 108" may generate a transaction element 114*d* that is issued to the second storage resource 108''''. Given the present example, it can be seen that the elapsed time to conduct the transaction requires a finite amount of time, the extent of which may be dependent upon loading levels existent on each of the resources 108 involved in the transaction as well as the configuration of the storage resources 108''' and 108'''' in the integrated computing system 110. Embodiments of the present disclosure provide a technique for estimating an expected elapsed time to conduct the transaction at various loading levels by generating a function from which the estimated elapsed times may be either interpolated or extrapolated.

It should be important to note that the particular transaction described above is merely an example transaction, and the transaction analysis tool 104 may be used to generate functions for estimating other types of transactions without departing from the spirit and scope of the present disclosure. For example, the transaction may be a database transaction, such as a write operation, in which a certain amount of data is written to a database. Example of other types of transactions that may be measured by the transaction analysis tool 104 include authentication and/or authorization transactions used in a login negotiation process, calculations involving multiple operands distributed throughout the integrated computing system, and the like.

The loading level of a computing resource 108 (e.g., a computing device or a resource of a computing environment, such as a CI) generally refers to a proportional level at which the computing resource is operating relative to the maximum operating level of the resource. For example, a processor having a 50 percent loading level is considered to operating at 50 percent of its maximum capability. Multiple characteristics of the computing resource 108 may be monitored to determine its loading level. In one embodiment, the transaction analysis tool 104 may monitor a load of the processor of the computing resource 108 to determine its loading level. In another embodiment, the transaction analysis tool 104 may monitor a usage of the memory of the computing resource 108 to determine its loading level. In another embodiment, the transaction analysis tool 104 may monitor a network bandwidth consumed by the computing resource 108 to determine its loading level. In another embodiment, the transaction analysis tool 104 may monitor a level of heat and/or a level of power usage consumed by the computing resource to determine its loading level. Nevertheless, it should be understood that other characteristics of the computing resource 108 may be monitored to determine its loading level without departing from the spirit and scope of the present disclosure.

The computing resources 108 may include any type and number of computing devices in the integrated computing system 110. For example, the computing devices may include laptop or notebook computers, workstations, tablet computers, and the like, and/or complex computing structures, such as clusters, unified computing systems, fabric-based computing systems, and dynamic infrastructures. The computing devices may also include other communication devices, such as switches, routers, firewall appliances, or other communication device that facilitates communication among multiple other computing devices. The computing resource may also form a portion of an integrated computing system, such as a storage array, a network resource, a compute device, and/or any combination thereof. For example, the computing resource 108 may comprise one or more physical resources and/or virtual resources of a converged infrastructure.

In a specific example shown herein, multiple computing resources 108 may be provided by a converged infrastructure (CI). The computing resources 108 may include hardware resources (e.g., hosts 206) and/or virtual resources (e.g., virtual machines 208*a*, virtual switches 208*b*, and/or virtual storage objects 208*c*) executed by the hosts 206 of the converged infrastructure (See FIG. 2). In this case, the CI may include thousands of physical objects that each executes tens or even hundreds of virtual objects.

In one embodiment, the transaction analysis tool 104 may communicate with, and control the operation of the resources 108 using an operations management application 118. The operations management application 122 maintains information about the resources 108 used in the integrated computing system 110 and stores this information in the data source 118. The operations management application 122 may also control one or more aspects of the resources executed by the integrated computing system 110. Any suitable type of operations management application 122 may be implemented with the teachings of the present disclosure. In one embodiment, the operations management system 100 may include a VSPHERE™ software suite that is available from VMware Corporation, which is headquartered in Palo Alto, Calif.

If the computing resource 108 comprises an object of an integrated computing system, such as a converged infrastructure, the resources of the integrated computing system may represent hardware resources, software resource, and/or one or more virtual objects executed on those hardware resources, which may be implemented in a virtual computing environment, either physical or one providing virtualized resources using techniques such as virtualization. The virtual computing environment may be embodied in any computing system that provides bare metal computing devices, where the applications and operating system is executed directly on the compute resources, or virtualized components (virtual objects) executed on one or more physical hosts.

Resources of a converged infrastructure may include resources, such as data processing devices, data storage devices, servers, networking equipment, and/or other computing devices. A converged infrastructure includes a combination of these devices that are packaged and interconnected in a standardized manner for ease of maintenance and use. For example, a converged infrastructure 200 such as that shown in FIG. 2 includes components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing environment, such as a computer cluster, computing grid, blade array, and/or other computing infrastructure may be configured using the teachings of the present disclosure.

The transaction analysis tool 104 and the computing resources 108 communicate with one another using a communications network. Nevertheless, the transaction analysis tool 104 and the integrated computing system 110 may communicate with one another in any suitable manner. For example, the management computing system 102 and the integrated computing system 110 may communicate with each other using wireless, wired, and/or optical communications. In one specific embodiment, the transaction analysis tool computing system 102 and the integrated computing system 110 communicates with one another using a communication network, such as the Internet, an intranet, or other wired and/or wireless communication networks. In another embodiment, the management computing system 102 and the integrated computing system 110 communicate using any suitable protocol or messaging scheme. For example, these networks may communicate using a Hypertext Transfer Protocol (HTTP), extensible markup language (XML), extensible hypertext markup language (XHTML), or a Wireless Application Protocol (WAP) protocol. Other examples of communication protocols exist. For example, the systems may communicate without the use of a separate or a distinct network. Additionally, other embodiments contemplate that the modules employed by the transaction analysis tool 104 are executed by a computing device configured on the integrated computing system 110.

The data source 106 stores test records 120, simulation loading algorithms 122, transaction algorithms 124, and one or more curve fitting algorithms 126. The test records 120 store parametric data associated with transaction analysis tests conducted on the integrated computing system 110. For example, the test records 120 may store loading levels and their associated elapsed times required by one of the transaction algorithms 124 to be completed. The simulation loading algorithms 122 include executable code that can be downloaded onto, and executed on the resources 108 to simulate a desired loading level on its respective resource 108. For example, the simulation loading algorithms 122 may include an executable script that repeatedly performs a dummy calculation to use at least a portion of the available capacity of the resource 108. The transaction algorithms 124 include executable code for performing specific transaction on the integrated computing system 110. Examples of suitable transaction algorithms may include a read operation from memory, a write operation to memory, an authentication process, an authorization process, a calculation algorithm, and a message transmission. The curve fitting algorithms 126 store executable code for generating a function using multiple data points derived from the obtained elapsed times and associated loading levels. In general, each data point includes a value of the specified loading level of at least one resource 108, and an associated elapsed time value that is required to complete the transaction algorithm 124. Examples of suitable types of curve fitting algorithms include a linear regression algorithm, a Gaussian regression algorithm, an exponential regression algorithm, and the like.

Figure 2A:
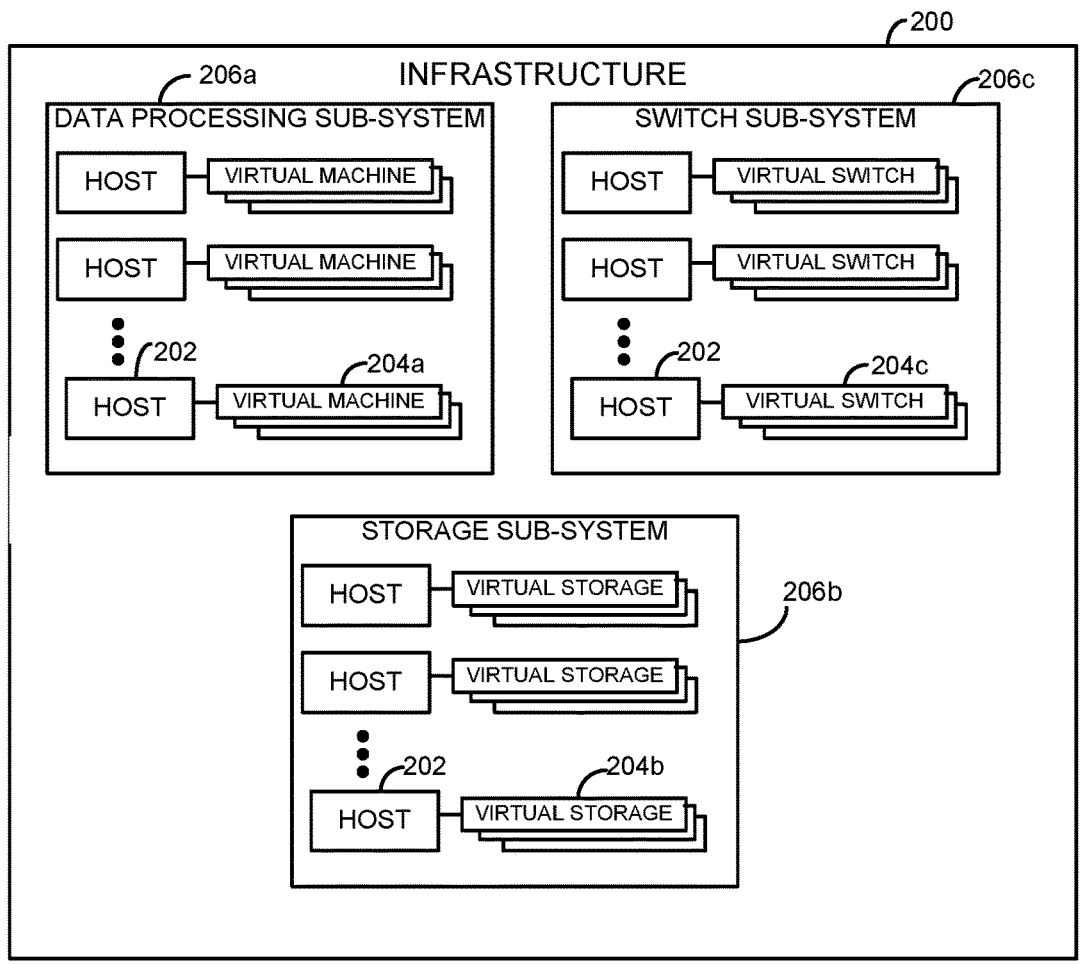
FIGS. 2A and 2B illustrate an example converged infrastructure that may be managed by the transaction analysis tool according to one embodiment of the present disclosure.

FIG. 2A illustrates an example converged infrastructure 200 that may provide multiple computing resources 108 to be monitored by the system 100 according to the teachings of the present disclosure. The converged infrastructure 200 may be any type having multiple hosts 202 that each executes an operating system and/or a hypervisor. In the case that a hypervisor is executed, the host 202 will execute one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is located in Palo Alto, Calif.

The operations management application 118 may manage various activities of the computing resources 108 of the converged infrastructure 200. For example, the operations management application 118 manages the allocation and de-allocation of resources, such as hosts and virtual objects used by the system. Additionally, the operations management application 118 may manage the remediation of failures in the system by monitoring the health of each resource and performing corrective measures, such as migration (e.g., failover) to different resources in the event that certain resources have failed. The file system manager may also control one or more aspects of the resources (e.g., hosts and virtual objects) used by the converged infrastructure 200. Any suitable type of file system manager may be implemented with the teachings of the present disclosure. In one embodiment, the system 100 includes a VSPHERE™ software suite that is available from VMware Corporation, which is located in Palo Alto, Calif.

Figure 2B:
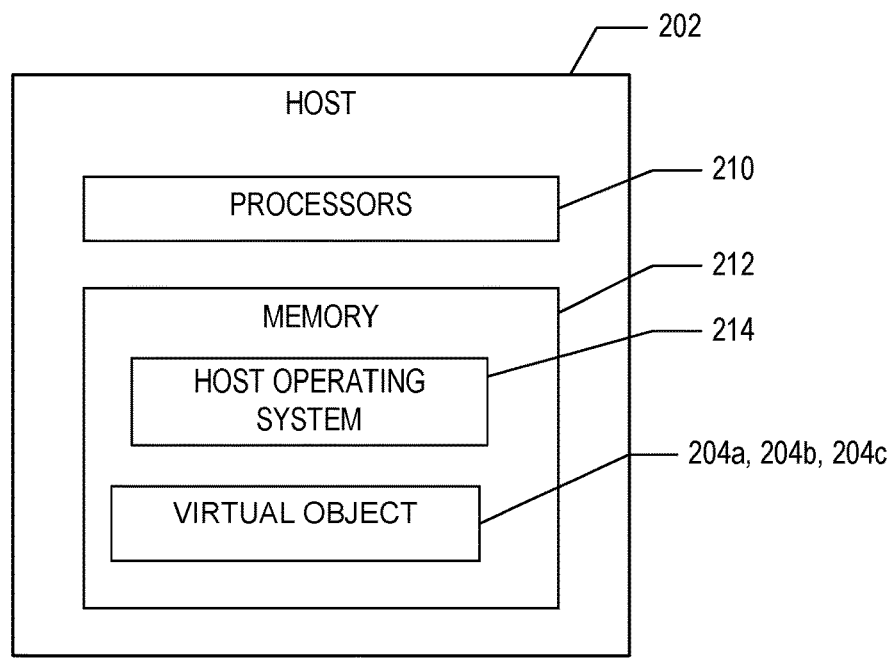

FIG. 2B illustrates an example host 202 implemented on each converged infrastructure 200 according to one aspect of the transaction analysis tool 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
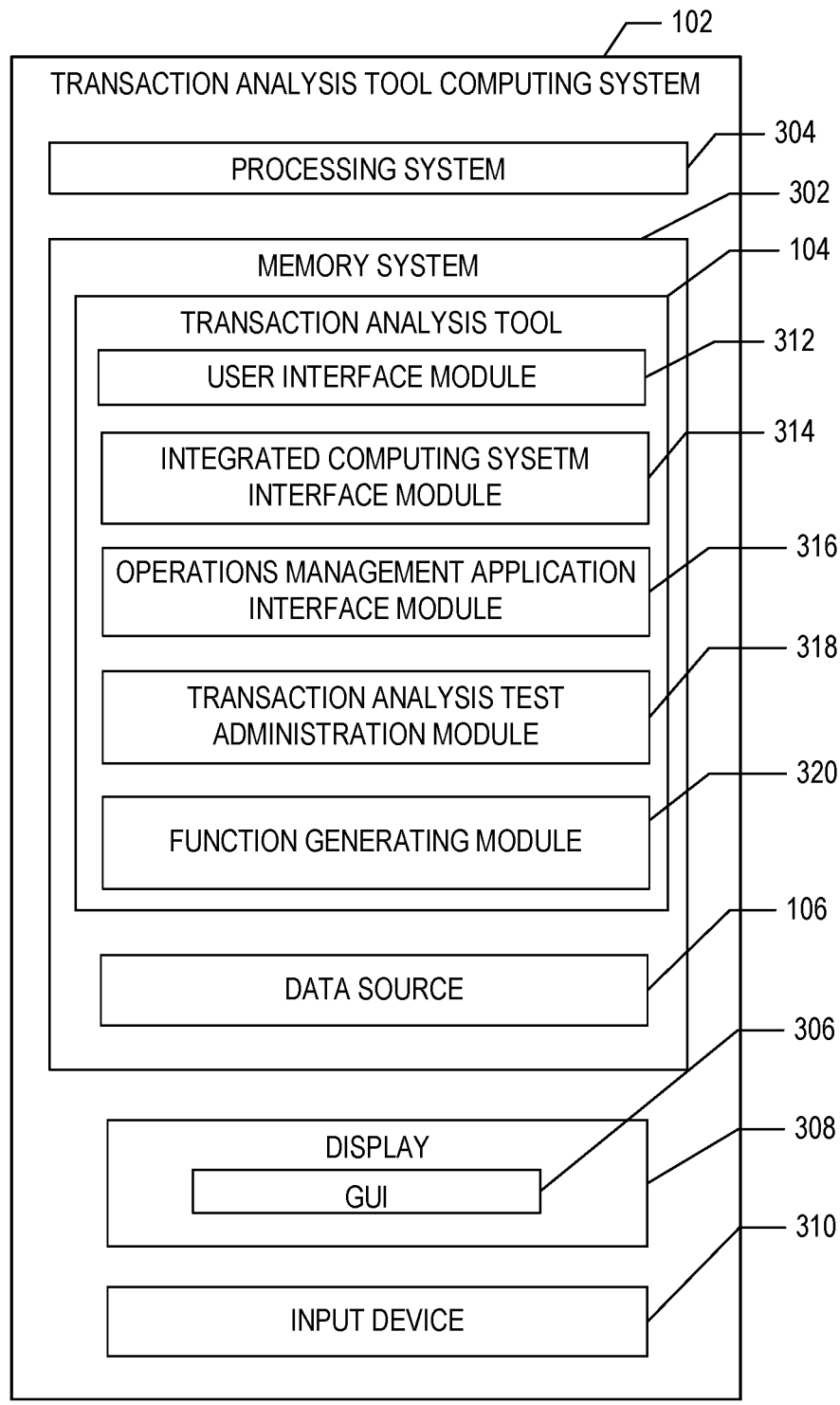
FIG. 3 illustrates a block diagram of an example transaction analysis tool executed on the transaction analysis tool computing system according to one embodiment of the present disclosure.

Referring now in more detail to FIG. 3, a block diagram of an example transaction analysis tool 104 executed on the transaction analysis tool computing system 102, is depicted according to one aspect of the present disclosure. The transaction analysis tool 104 is stored in a memory 302 (e.g., computer readable media) and executed on a processing system 304 (e.g., computing unit) of the management computing system 102. The management computing system 102 may include any type of computing system, such as one or more management computing systems, personal computers, mobile computers and/or other mobile devices, and other hosts.

According to one aspect, the transaction analysis tool computing system 102 also includes a graphical user interface (GUI) 306 displayed on the display 308, such as a computer monitor, for displaying data. The transaction analysis tool computing system 102 also includes an input device 308, such as a keyboard or a pointing device (e.g., a mouse, trackball, pen, or touch screen) to enter data into or interact with the GUI 306. According to one aspect, the transaction analysis tool 104 includes instructions or modules that are executable by the processing system 302 as will be described in detail herein below.

The memory 302 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

A user interface module 312 facilitates the receipt of input data and/or output data from or to a user. In one example, the user interface module 312 may receive user input, such as parametric data used for determining a function based upon varying loading levels on the integrated computing system 110, a type of curve fitting algorithm to be used, the varying loading levels that the test transaction is to be conducted at, and the like. As another example, the user interface module 312 may display the determined function for view by the user. As yet another example, the user interface module 312 may receive user input for retrieving functions determined from previous tests, and/or storing a recently determined curve fitting algorithm 126 in the data source 106.

An integrated computing system interface module 314 provides an interface for communicating with the resources 108 of the integrated computing system 110. For example, the integrated computing system 110 may expose one or more APIs for each of its resources 108 that may be accessed by the integrated computing system interface module 314 for receiving information about the resources 108 and any loading conditions existing thereon, and/or for transmitting control information to the resources 108. The integrated computing system interface module 314 also receives status information from the integrated computing system 110 for monitoring various operational aspects, such as configuration, operational status, system alarm conditions, and the like. In one embodiment, the integrated computing system interface module 314 communicates with, and controls operation of the resources 108 of the integrated computing system 110 via the operations management application 118.

A transaction analysis test administration module 318 manages the operation of the transaction algorithms 124 on the resources 108 on the integrated computing system 110. For example, transaction analysis test administration module 318 may receive input from the user interface module 312 for performing a certain transaction algorithm 124 when the compute sub-system is at each of certain specified loading levels (e.g., 10 percent (%), 25%, and 50%), control the resources 108 to perform the transaction algorithm 124 at each of those loading levels, and obtain measurements associated with an elapsed time required to complete the transaction algorithm 124 at the differing loading levels. Thus, if the transaction algorithm 124 is performed at the loading levels of 10%, 25%, and 50%, three data points may be created from which a function that is fitted to those data points may be generated.

In one embodiment, the transaction analysis test administration module 318 may also control the resources 108 or different resources 108, to perform the transaction algorithm 124 with different configurations of the integrated computing system 110. For example, transaction analysis test administration module 318 may receive input from the user interface module 312 for performing a certain transaction algorithm 124 at a certain specified loading level for each of multiple different configurations of the integrated computing system 110, control the resources 108 to perform the transaction algorithm 124 at each of those different configurations, and obtain measurements associated with an elapsed time required to complete the transaction algorithm 124 with the different configurations. That is, the integrated computing system 110 may be configured with a first configuration that utilizes a unified storage sub-system, the unified storage sub-system loaded to a specified level, and the transaction algorithm 124 executed to determine an elapsed time required to complete the transaction algorithm 124. Next, the integrated computing system 110 may be configured with a second configuration that utilizes a different type of storage sub-system, the unified storage sub-system loaded to the specified level, and the transaction algorithm 124 executed to determine an elapsed time required to complete the transaction algorithm 124 using the different type of storage sub-system. The previous procedure may be conducted at other configurations of the storage sub-system so that the user may obtain empirical data as to how well the transaction algorithm 124 performs at the differing configurations.

A function generating module 320 generates a function according to the data points obtained by the transaction analysis test administration module 318. The function may be generated in any suitable manner. For example, the function generating module 320 may use a regression algorithm, such as a linear regression algorithm or a Gaussian regression algorithm, to generate a function that optimally estimates the transaction performance at other loading levels. For example, if the transaction algorithm 124 is performed at a 10 percent, a 20 percent, and a 30 percent loading level, and the function generating module 320 is used to generate a linear function using a linear regression algorithm, the slope of the linear function may indicate projected performance levels (e.g., 50 percent, 80 percent, etc.) at other loading levels of the integrated computing system 110.

Any suitable type of function may be generated. For example, when it is known that the loading levels may incur an exponential decrease in performance level, an algorithm that generates a function having an exponentially decreasing slope may be implemented to generate the function. In one embodiment, the function generating module 320 may employ a curve fitting algorithm that generates a function based upon the obtained elapsed time measurements and the different loading levels. For example, may detect that the multiple sets of data obtained from the transaction analysis test administration module 318 may have a best fit if the function is parabolic, and as a result, generate a parabolic function that optimally represents the data points.

It should be appreciated that the modules described herein are provided only as examples, and that the transaction analysis tool 104 may have different modules, additional modules, or fewer modules than those described herein. For example, one or more modules as described in FIG. 3 may be combined into a single module. As another example, certain modules described herein may be encoded on, and executed on other computing environments, such as on one of the hosts 202 of a converged infrastructure 200 as described above with reference to FIGS. 2A and 2B.

Figure 4A:
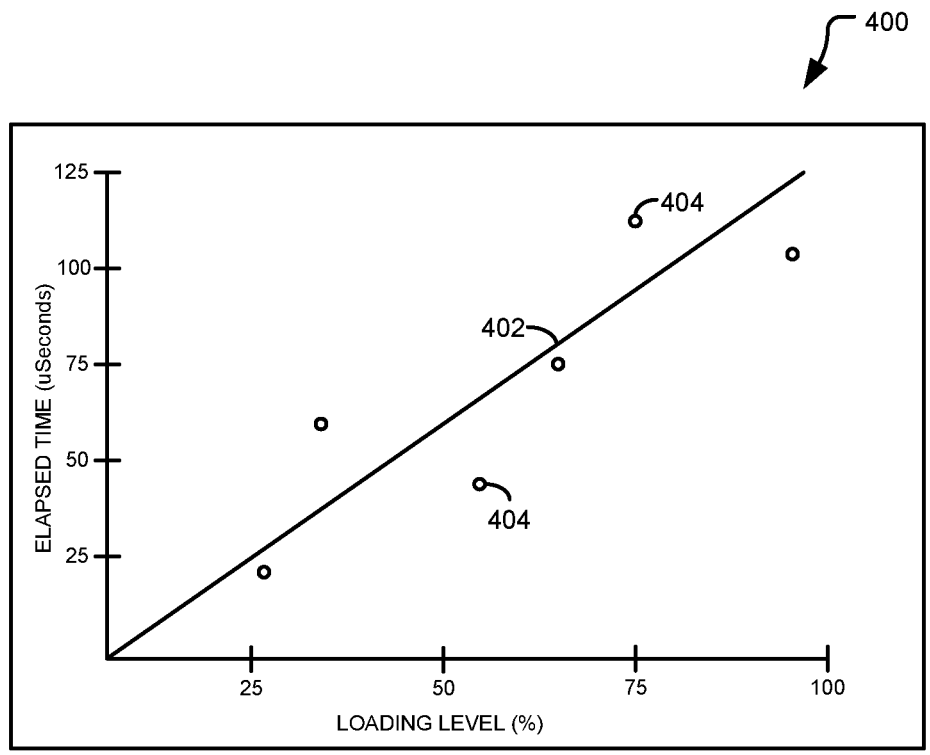
FIGS. 4A and 4B illustrate example graphs that may be generated by the transaction analysis tool to display functions for estimating a performance of an integrated computing system at different loading levels according to one embodiment of the present disclosure.
Figure 4B:
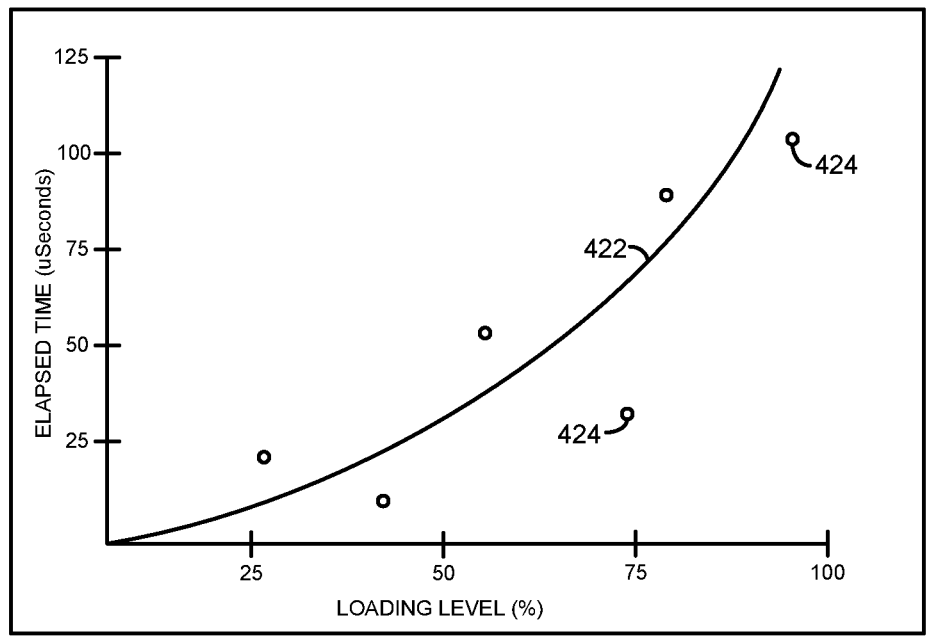

FIGS. 4A and 4B illustrate example graphs 400 and 420 that may be generated by the transaction analysis tool 104 to display functions for estimating a performance of an integrated computing system 110 at different loading levels according to one embodiment of the present disclosure. In general, FIG. 4A illustrates a linear function 402 that may be generated by the transaction analysis tool 104 using data points 404, while FIG. 4B illustrates a parabolic function 422 that may be generated by the transaction analysis tool 104 using other data points 424.

The transaction analysis tool 104 may generate a type of function (e.g., linear function, parabolic function, exponential function, etc.) according to user input via the user interface 308. Alternatively, the transaction analysis tool 104 may automatically determine a type of function according to the values of the data points. For example, the transaction analysis tool 104 may receive user input to generate a linear function using a linear regression algorithm, and generate a linear function based on this input. As another example, the transaction analysis tool 104 may receive user input via the user interface to automatically select a type of function based upon the data points it receives. As shown, in FIG. 4A, for example, the data points 404 show that a linear function may be optimally suited for the data points 404, and thus a linear function 402 is generated. Alternatively, as shown in FIG. 4B, the data points 412 show that a parabolic function may be optimally suited for the data points 412, and thus a parabolic function 410 is generated.

It can be seen from the example graphs 400, 420 that although data points were only taken at 10 percent, 25 percent, and 50 percent, the resulting functions can be used to extrapolate expected performance levels at other loading levels, such as 75 percent, or 95 percent loading levels. Although the example functions described above show linear and parabolic functions, it should be appreciated that the transaction analysis tool 104 may generate other types of functions, such as hyperbolic, exponential, logarithmic functions without departing from the spirit and scope of the present disclosure.

Figure 5:
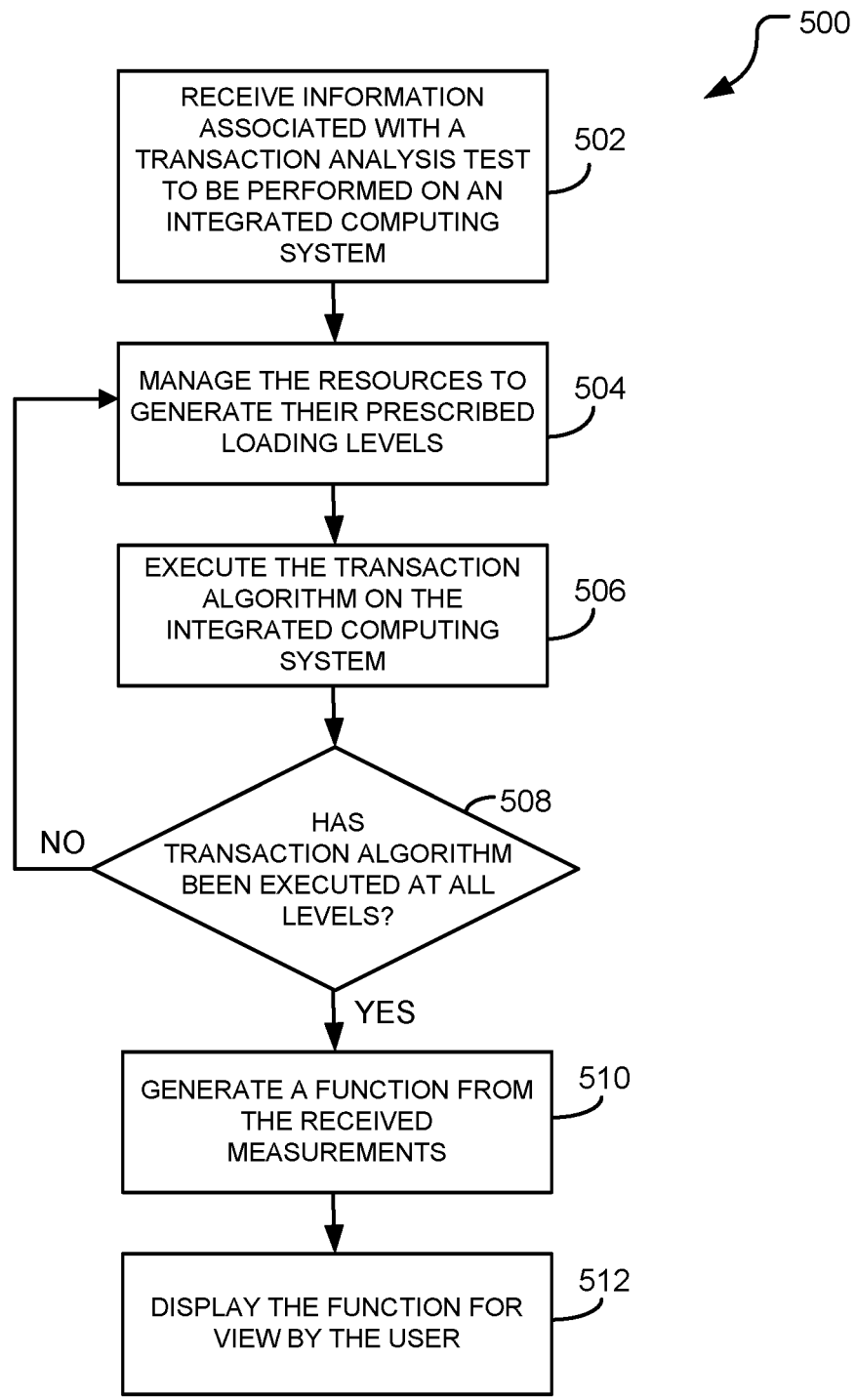
FIG. 5 illustrates an example process that is performed by the transaction analysis tool according to one embodiment of the present disclosure.

FIG. 5 illustrates an example process 500 that is performed by the transaction analysis tool 104 to generate a function using two or more data points obtained from a transaction algorithm 124 conducted on an integrated computing system 110 at different loading levels.

At step 502, the transaction analysis tool 104 receives user input associated with a transaction analysis test to be performed on the integrated computing system 110. For example, the transaction analysis tool 104 may receive parametric information, such as how many, and the values of loading levels to be measured at, a specific transaction algorithm 124 to be used for the test, a type of function to be fitted to the data points, and/or whether the type of function is explicitly specified or automatically determined by the transaction analysis tool 104.

In one embodiment, the transaction analysis tool 104 may receive loading level values for individual sub-systems in the integrated computing system, such as a sub-system 206 of a CI 200, such as described above with reference to FIGS. 2A and 2B. For example, the transaction analysis tool 104 may receive entry of a certain loading level to be incurred by the data processing sub-system 206a, a second loading level to be incurred by the storage sub-system 206b, and a third loading level to be incurred by the network sub-system 206c in which each combination of loading levels form one data point for generating the function. Other combinations of loading levels for each of the sub-systems 206 may be used to create other data points for generating the function. Although the example above shows that the transaction analysis tool 104 may generate data points using varying loading levels for the sub-systems of a CI, it should be appreciated that any combination of loading levels may be placed upon any structured combination of resources 108 in the integrated computing system 110. For example, the transaction analysis tool 104 may receive input for assigning a first loading level to a first group of compute resources 108 that perform a certain task, and assign a second loading level to a second group of compute resources 108 that perform a different task associated with the transaction algorithm 124.

At step 504, the transaction analysis tool 104 manages the resources 108 to generate their prescribed loading levels. In one embodiment, the transaction analysis tool 104 may download one or more simulation loading algorithms 122 onto each resource 108 to be loaded, and execute the simulation loading algorithms 122 so that the resources 108 are loaded to their specified degree. For example, each simulation loading algorithm 122 may include a regulation mechanism that measures the current degree of loading from the resource 108 it is being executed on, and increase its workload when the loading level goes below a certain specified threshold value and decrease its workload when the loading exceed a certain specified upper threshold level. The simulation loading algorithm 122 may increase or decrease its workload in any suitable manner. For example, the simulation loading algorithm 122 may increase and/or decrease its workload level by adjusting its priority (e.g., using a UNIX nice command).

In another embodiment, the transaction analysis tool 104 may establish one or more triggers based upon the specified loading level values, and trigger execution of the transaction algorithm 124 when the loading level of the triggers are met. For example, if the test is conducted on an operational integrated computing system 110 and the specified loading levels for a particular resource 108 is set at 10% and 50%, the transaction analysis tool 104 may monitor the operation of the resource 108 and trigger execution of the transaction algorithm 124 when the loading levels of the resource 108 achieve 10% (e.g., at night when the integrated computing system is receiving relatively little usage), and again when the loading level achieves 50% (e.g., at daytime when the integrated computing system is receiving relatively greater usage).

At step 506, the transaction analysis tool 104 executes the transaction algorithm 124 on the integrated computing system 110, and measures an elapsed time to complete the transaction algorithm 124. In one embodiment, the transaction analysis tool 104 communicates with the operations management application 118, which controls operation of the resources 108 to perform the transaction algorithm 124. Thereafter at step 508, the transaction analysis tool 104 determines whether the transaction algorithm 124 has been performed at all specified loading levels. If so, processing continues at step 510; otherwise, processing continues at step 504 to change the loading levels of the resources 108 to the next loading level to be tested at.

At step 510, the transaction analysis tool 104 generates a function from the received measurement of elapsed time and their associated loading level values. In one embodiment, the transaction analysis tool 104 generates a type of function specified by the user. For example, the transaction analysis tool 104 may receive user input specifying that a linear regression curve fitting algorithm be used for generating the function. Thus, the transaction analysis tool 104 will generate a linear function using the linear regression curve fitting algorithm. As another example, the transaction analysis tool 104 may receive user input requesting that the type of curve be determined according to the parametric data received. Thus, when the transaction analysis tool 104 processing the received parametric data, it may determine a particular type of function (e.g., linear, parabolic, hyperbole, exponential, etc.) based upon the nature of the data received.

At step 512, the transaction analysis tool 104 displays the function for view by the user. Given the displayed function, users may be provided with an estimation of the performance of the integrated computing system 110 at other loading levels. For example, although the transaction algorithm 124 was only conducted at loading levels of 10% and 25%, the function may provide insight to an expected performance level of the integrated computing system 110 at other loading levels, such as at 75%, 88%, 95%, and the like.

The previous steps may be repeatedly performed for combinations of loading levels and transaction algorithms 124 on the integrated computing system 110. Additionally, the configuration of the integrated computing system 110 may be modified and the test conducted again to determine the difference in performance due to changes in the integrated computing system's configuration. Nevertheless, when use of the transaction analysis tool 104 is no longer needed or desired, the process ends.

Although FIG. 5 describes one example of a process that may be performed by the transaction analysis tool 104, the features of the disclosed process may be embodied in other specific forms without deviating from the spirit and scope of the present disclosure. For example, the transaction analysis tool 104 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
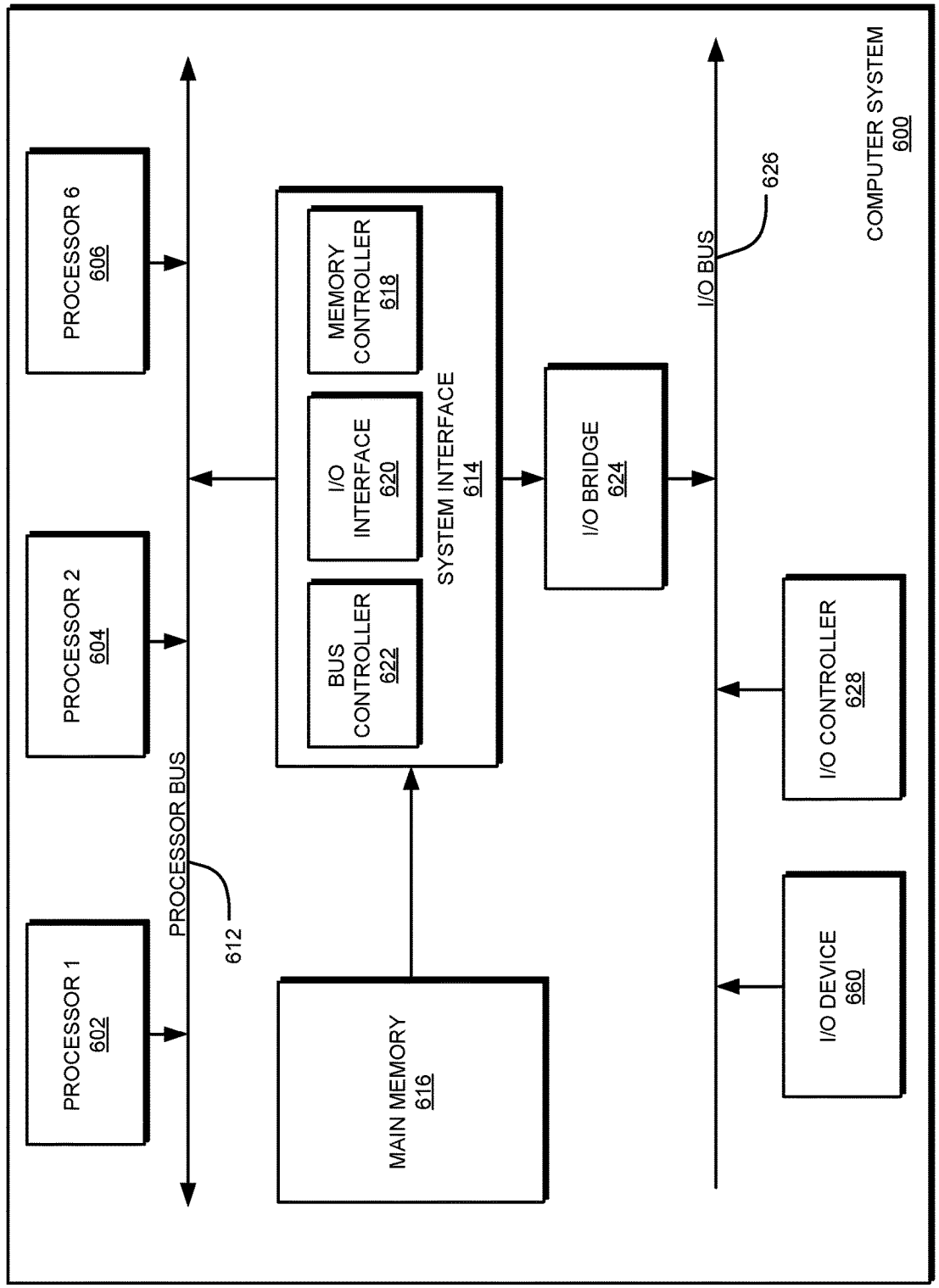
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A transaction analysis apparatus comprising:
a computing device in communication with an operational integrated computing system having a plurality of sub-systems, the computing device comprising at least one processor and at least one memory to store executable instructions that are executed by the at least one processor to:
manage a first sub-system of the plurality of sub-systems to operate at a first loading level and a second sub-system of the plurality of sub-systems, different from the first sub-system, to operate at a second loading level different than the first loading level;
execute a transaction on the integrated computing system based on a trigger comprising a first specified loading level of the first sub-system of the plurality of sub-systems and a second specified loading level of the second sub-system of the plurality of sub-systems;
obtain a first elapsed time to complete the transaction on the first sub-system and the second sub-system of the plurality of sub-systems, the transaction occurring on the first sub-system operating at the first loading level and the second sub-system operating at the second loading level simultaneously;
manage the first sub-system of the plurality of sub-systems and the second sub-system of the plurality of sub-systems to operate at a third loading level, the third loading level different than the first loading level and the second loading level;

obtain a second elapsed time to complete the transaction on the first sub-system and the second sub-system at the third loading level; and generate, using a curve fitting algorithm, a function according to the first elapsed time to complete the transaction and the second elapsed time to complete the transaction, wherein the function indicates an expected level of performance of the transaction at varying degrees of loading levels.

2. The transaction analysis apparatus of claim 1, wherein the instructions are further executed to determine a type of the curve fitting algorithm according to the first elapsed time and the second elapsed time.

3. The transaction analysis apparatus of claim 1, wherein the instructions to manage the first sub-system and the second sub-system comprise a simulation loading algorithm that is executed on the first sub-system and the second sub-system, the simulation loading algorithm generating the first elapsed time to complete the transaction.

4. The transaction analysis apparatus of claim 3, wherein the simulation loading algorithm includes a regulator to measure a corresponding loading level of the first sub-system and the second sub-system during execution of the simulation loading algorithm and to adjust a workload of the simulation loading algorithm according to the measured corresponding loading level of the first sub-system and the second sub-system.

5. The transaction analysis apparatus of claim 1, wherein the transaction comprises at least one of a read operation from a memory component of the first sub-system or the second sub-system, a write operation to the memory component of the first sub-system or the second sub-system, an authentication process, an authorization process, a calculation algorithm, or a message transmission between the first sub-system and the second sub-system.

6. The transaction analysis apparatus of claim 1, wherein the instructions are further executed to:
obtain a third measured elapsed time to complete the transaction on a subset of the plurality of sub-systems that are each loaded at a first plurality of loading levels, the first plurality of loading levels being set independently of one another; and
obtain a fourth measured elapsed time to complete the transaction on the subset of the plurality of sub-systems that are each loaded at a second plurality of the loading levels, the second plurality of the loading levels being set independently of one another;
wherein the function is further generated according to the third measured elapsed time to complete the transaction at the first plurality of loading levels and the fourth measured elapsed time to complete the transaction at the second plurality of the loading levels.

7. The transaction analysis apparatus of claim 6, wherein at least a first portion of the subset of the plurality of sub-systems are loaded at the first loading level and at least a second portion of the subset of the plurality of sub-systems are loaded at the second loading level during obtaining the third measured elapsed time.

8. The transaction analysis apparatus of claim 1, wherein the instructions are further executed to display the function on a display device.

9. A transaction analysis method comprising:
managing, using executable instructions stored in a non-transitory storage medium and executed on at least one processor, a first sub-system of a plurality of sub-systems of an operational integrated computing system to operate at a first loading level;

managing, using the instructions, a second sub-system of the plurality of sub-systems, different from the first sub-system, to operate at a second loading level different than the first loading level;
executing, using the instructions, a transaction on the integrated computing system based on a trigger comprising a first specified loading level of the first sub-system of the plurality of sub-systems and a second specified loading level of the second sub-system of the plurality of sub-systems;
obtaining, using the instructions, a first measured elapsed time to complete the transaction on the first sub-system operating at the first loading level and the second sub-system operating at the second loading level simultaneously;
managing, using the instructions, the first sub-system and the second sub-system to operate at a third loading level, the third loading level different from the first loading level and the second loading level;
obtaining, using the instructions, a second measured elapsed time to complete the transaction on the first sub-system and the second sub-system at the third loading level; and
generating, using the instructions, a function according to the first measured elapsed time to complete the transaction and the second measured elapsed time to complete the transaction a curve fitting algorithm, wherein the function indicates an expected level of performance of the transaction at varying degrees of loading levels.

10. The transaction analysis method of claim 9, further comprising determining a type of the curve fitting algorithm according to the obtained first and second measured elapsed times.

11. The transaction analysis method of claim 9, wherein managing the first sub-system at the first loading level and the second sub-system to operate at the second loading level comprises one or more simulation loading algorithms that are executed on the first sub-system and the second sub-system, the simulation loading algorithms yielding the first loading level and the second loading level respectively.

12. The transaction analysis method of claim 11, further comprising:
measuring, by at least one simulation loading algorithm, a loading level of the first sub-system and the second sub-system, the loading level of the first sub-system and the second sub-system based at least on a workload executed on the first sub-system and the second sub-system; and
adjusting, by the at least one simulation loading algorithm, the workload according to the measured loading level of the first sub-system and the second sub-system to regulate the loading level.

13. The transaction analysis method of claim 9, wherein the transaction comprises at least one of a read operation from a memory component of the first sub-system or the second sub-system, a write operation to the memory component of the first sub-system or the second sub-system, an authentication process, an authorization process, a calculation algorithm, or a message transmission between the first sub-system and the second sub-system.

14. The transaction analysis method of claim 9, further comprising:
obtaining a third measured elapsed time to complete the transaction on a subset of the plurality of sub-systems that are each loaded at a first plurality of loading levels, the first plurality of loading levels being set independently of one another; and obtaining a fourth measured elapsed time to complete the transaction on the subset of the plurality of sub-systems that are each loaded at a second plurality of loading levels, the second plurality of loading levels being set independently of one another;

wherein the function is further generated according to the third measured elapsed time to complete the transaction at the first plurality of loading levels and the fourth measured elapsed time to complete the transaction at the second plurality of loading levels.

15. The transaction analysis method of claim 14, wherein at least a first portion of the subset of the plurality of sub-systems are loaded at the first loading level and at least a second portion of the subset of the plurality of sub-systems are loaded at the second loading level during obtaining the third measured elapsed time.

16. A non-transitory, computer readable medium comprising code that when executed by at least one processor, is operable to perform at least the following:

managing, using executable instructions stored in a non-transitory storage medium and executed on at least one processor, a first sub-system of a plurality of sub-systems of an operational integrated computing system to operate at a first loading level;

managing, using the instructions, a second sub-system of the plurality of sub-systems, different from the first sub-system, to operate at a second loading level different than the first loading level;

executing, using the instructions, a transaction on the integrated computing system based on a trigger comprising a first specified loading level of the first sub-system of the plurality of sub-systems and a second specified loading level of the second sub-system of the plurality of sub-systems;

obtaining, using the instructions, a first measured elapsed time to complete the transaction on the first sub-system operating at the first loading level and the second sub-system operating at the second loading level simultaneously;

managing, using the instructions, the first sub-system and the second sub-system to operate at a third loading level, the third loading level different from the first loading level and the second loading level;

obtaining, using the instructions, a second measured elapsed time to complete the transaction on the first sub-system and the second sub-system at the third loading level; and generating, using the instructions, a function according to the first measured elapsed time to complete the transaction on the first sub-system operating at the first loading level and the second sub-system operating at the second loading level simultaneously and the second measured elapsed time to complete the transaction at the third loading level using a curve fitting algorithm, wherein the function indicates an expected level of performance of the transaction at varying degrees of loading levels.

17. The non-transitory, computer readable medium of claim 16, further operable to perform determining a type of the curve fitting algorithm according to the obtained first and second measured elapsed times.

18. The non-transitory, computer readable medium of claim 16, wherein managing the first sub-system and the second sub-system comprises one or more simulation loading algorithms that are executed on the first sub-system and the second sub-system, the simulation loading algorithms yielding the corresponding loading levels.

19. The non-transitory, computer readable medium of claim 16, further operable to perform:

measuring, by at least one simulation loading algorithm, an operating loading level of the first sub-system and the second sub-system, the operating loading level of the first sub-system and the second sub-system based at least on a workload executed on the first sub-system and the second sub-system; and adjusting, by the at least one simulation loading algorithm, the workload according to the measured operating loading level of the first sub-system and the second sub-system to regulate the operating loading level.

20. The non-transitory, computer readable medium of claim 16, further operable to perform:

obtaining a third measured elapsed time to complete the transaction on a subset of the plurality of sub-systems that are each loaded at a first plurality of levels, the first plurality of levels being set independently of one another; and obtaining a fourth measured elapsed time to complete the transaction on the subset of the plurality of sub-systems that are each loaded at a second plurality of loading levels, the second plurality of loading levels being set independently of one another;

wherein the function is further generated according to the third measured elapsed time to complete the transaction at the first plurality of levels and the fourth measured elapsed time to complete the transaction at the second plurality of loading levels.

21. The non-transitory, computer readable medium of claim 20, wherein at least a first portion of the subset of the plurality of sub-systems are loaded at the first loading level and at least a second portion of the subset of the plurality of sub-systems are loaded at the second loading level during obtaining the third measured elapsed time.

* * * * *